Figure 1:
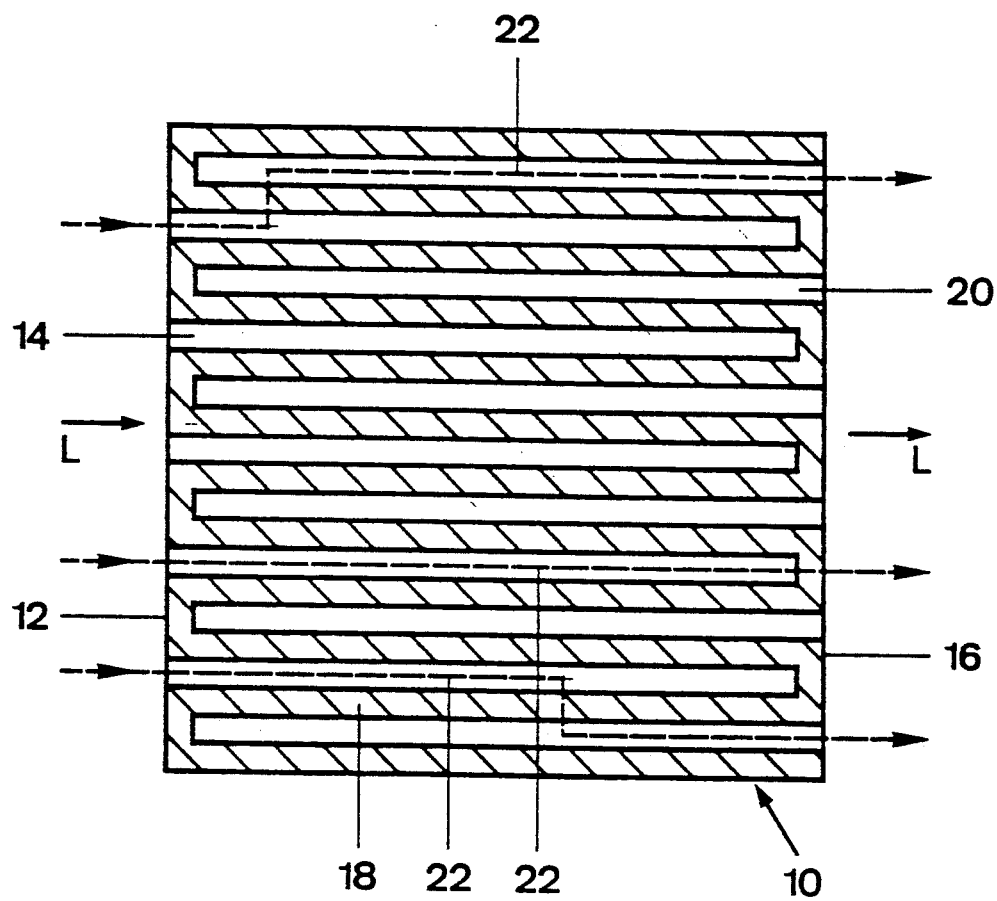

United States Patent [19]

Gabathuler et al.

[11] Patent Number: 5,066,432
[45] Date of Patent: Nov. 19, 1991

[54] PROCESS FOR MANUFACTURING A CERAMIC FOAM BODY

[75] Inventors: Jean-Pierre Gabathuler, Schleitheim; Karl-Ludwig Eckert; Peter Käser, both of Schaffhausen; Albert Maurer, Thayngen; Anton Fischer, Schaffhausen, all of Switzerland

[73] Assignee: Alusuisse-Lonza Services Ltd., Zurich, Switzerland

[21] Appl. No.: 554,277

[22] Filed: Jul. 18, 1990

[30] Foreign Application Priority Data

Aug. 8, 1989 [CH] Switzerland .......................... 2925/89

[51] Int. Cl.⁵ .......................... B05B 3/00; B29C 65/00
[52] U.S. Cl. .......................... 264/28; 264/44; 264/58; 264/154
[58] Field of Search .......................... 264/44, 59, 138, 162, 264/163, 28, 58, 155, 156, 154; 55/521, 523

[56] References Cited

U.S. PATENT DOCUMENTS 3,112,184 11/1963 Hollenbach .......................... 25/156
4,643,749 2/1987 Miura .......................... 55/523

FOREIGN PATENT DOCUMENTS 0225402 6/1987 European Pat. Off. .

OTHER PUBLICATIONS

Patent Abstracts of Japan—58-92549, 8/24/83.
Patent Abstracts of Japan—for Japanese Patent 58-949-43—dated 8-27-83.
Chemical Abstracts—vol. 98, No. 16—1983—Abstract No. 131218y.

Primary Examiner—Jan H. Silbaugh
Assistant Examiner—Christopher A. Fiorilla
Attorney, Agent, or Firm—Bachman & LaPointe

[57] ABSTRACT

The process for manufacturing an open pore foam body with three dimensional ceramic network, in particular as a filter for the treatment of hot gases or as a catalyst substrate, has as its starting material a block of open pore plastic foam. This is impregnated at least once with a ceramic suspension, freed of excess ceramic suspension and heated to a temperature below the melting point of the plastic, then finally burnt off at a temperature at which the ceramic sinters together. The plastic foam block of the prescribed outer dimensions is cooled down and machined to produce a Z-flow filter with high precision longitudinal channels.

20 Claims, 3 Drawing Sheets

PROCESS FOR MANUFACTURING A CERAMIC FOAM BODY

The invention relates to a process for manufacturing an open pore foam body with three-dimensional ceramic network structure, in particular as a filter for treatment of hot gases or as catalyst substrate, starting from a soft, open pore plastic foam block which is impregnated at least once with a ceramic suspension, freed of excess ceramic suspension, heated to a temperature below the melting point of the plastic and finally burned off at a temperature at which the ceramic sinters together.

It has been shown to be advantageous with known hot gas or catalytic treatments to produce ceramic foam in the form of cylindrical, stable blocks. Such blocks are provided with a high cross-sectional surface area by means of holes alternately in the front and rear with respect to the direction of flow of the gas; the said large cross-sectional surface area ensures adequate possibility for gas to flow through the ceramic foam.

The principle of hot gas filtration or catalytic treatment using an open pore ceramic foam is illustrated in FIG. 1 of the drawings be which represents the state-of-the-art device. The gas flowing through the ceramic foam body 10 in the direction indicated by the arrow L enters longitudinal flow channels 14 on the entry end 12; these channels 14 are closed towards the exit end 16 of the ceramic foam filter 10.

The pressure built up in the channels 14 causes the gas to flow through the open pore cell walls 18 of the ceramic foam body into the neighboring, likewise longitudinal channels 20 which are open at the exit end 16, but closed at or near to the entry end 12.

Dotted lines 22 indicate by way of example the routes taken by gas molecules through the ceramic foam body 10. In by far most cases the gas molecules flow from one channel 14 on the whole approximately vertically through a porous dividing wall 18 into a channel 20 where they flow out of the body. Depending on the type of foam body, as the gas passes through the porous dividing wall 18 solid constituents are removed from the gas or a catalytic reaction takes place.

The type of foam body shown in FIG. 1 is called a Z-flow filter because, for the main part, the flow path taken by the gas through the open pore ceramic structure is essentially Z-shaped.

If the ratio of length to diameter of the channels 14, 20 exeeds a specific value, for example 3-5, then considerable problems arise with the ceramic foam body manufactured by the normal manufacturing processes. Normally during manufacture of the ceramic foam body, an organic foam is impregnated with a ceramic suspension and then sintered in a process in which the foam is burnt off. Depending on the version of the ceramic foam required one must therefore first have a corresponding soft foam structure of organic material.

As the normal mechanical methods for producing deep holes of high accuracy and small cross-section in soft plastic foam can no longer be used, other methods of manufacture must be employed.

The Japanese patent publication No. 61-222968 and European Patent EP-A1 019 2158 describe in detail the production of organic foam bodies which are foamed in-situ in a mold. The disadvantages of this process are obvious: a complicated mold has to be manufactured, the process is labor intensive and therefore as a whole expensive.

The object of the present invention is to develop a process of the kind described at the start which makes it possible to use methods that allow deep channels of small cross-section to be made at favorable cost thus providing an optimal balance between pressure-loss and efficiency without considerable tool costs.

This object is achieved by way of the invention in that the plastic foam block with the necessary outer dimensions is cooled and machined to form a Z-flow filter with longitudinal channels of high precision.

The prescribed outer dimensions of the plastic foam which is preferably of polyurethane, polyester or polyether, are achieved by cutting or foaming in simple molds. The preferably cylindrical plastic foam bodies are in practice usually between 50 and 500 mm, preferably between 90 and 320 mm, in diameter and 100-400 mm, preferably 150-300 mm in height. The porosity is usefully in the range 10-100 PPI, in particular 50-80 PPI, wherein PPI are pores per inch.

Of course apart from the cylindrical form the outer contours of the plastic foam body can be of any other useful shape e.g. that of a blunted cone, cube, parallelpiped block or frustum.

The machining of the cooled plastic foam body using conventional methods provides parallel, longitudinal blind holes which run alternately from one front end to the region of the other end (FIG. 1). The depth of the holes forming the channels is preferably at least five times the smallest cross-sectional dimension. The distance of the blind end of the hole from the neighboring end is at least the same as the mutual spacing of the holes. This prevents a significant fraction of the gas flowing directly out of the exit end.

The cross-section of the longitudinal holes can be of any geometrical shape. The sidewalls of the holes can run straight, be narrowing or broadening. The variety in shape is limited simply to the limits set by machining methods. In the simplest case the hole has a round cross-section produced by a drill or milling tool. With a milling tool, however, one can also create straight or radial running slits or annular slots. The hole diameter or the smallest cross-section dimension of the slit or annular slot is preferably 5-50 mm, in particular 6-15 mm.

The distance between the holes is preferably in the range 5-50 mm, preferably 6-15 mm. The distance of the blind end of a hole from the neighboring end is preferably 10-50 mm, in particular, 20-30 mm. In other words a hole is 10-50 mm, preferably 20-30 mm, shorter than the overall length of the corresponding plastic foam block. Both the mutual spacing between the holes and the distance of the blind end of the holes from the neighboring end of the plastic foam block are approximately the same length in practice.

According to a first version of the invention the plastic foam block is made rigid by cooling to a very low temperature which is achieved for example by flooding with liquid nitrogen or liquid air. The brittle plastic foam can then be machined to high precision. The plastic foam featuring the machined holes reheats rapidly to room temperature.

According to a second version the pores in the plastic foam block are filled with a liquid medium at room temperature and the medium solidified. The plastic foam embedded in the solidified medium can then be machined to high precision. After the medium has liquified it is removed from the pores in the plastic block.

With the second version the pores in the plastic foam are preferably filled with water before machining. For the machining operation the temperature is lowered only a few degrees centigrade below the freezing point. The ice forms a solid support for the plastic which is still soft at that temperature; as a result the plastic can then be machined without problem. The plastic exhibits a clean dividing surface from the ice matrix.

The machining is performed in a conventional manner by boring, milling, sawing or cutting.

According to a third version a plastic foam block can be made up of a spirally wound strip. Before coiling, a strip of plastic foam is made rigid by cooling and channels machined on one strip surface. The reheated strip is then spirally wound into a block and calcined. In particular in the case of large-format foam bodies the strip is preferably impregnated once or twice before coiling. With small-format foam bodies the impregnating can also take place after the cooling.

Finally, according to a fourth version a large-format plastic foam block is made up of slices. The plastic foam in the form of slices is cooled. Holes and/or slits, preferably a regular distance apart, are made in a first series of slices. A fraction of the holes and/or slits is made in a second series of slices, and the remaining fraction of the holes and/or slits made in a third series.

Depending on the prescribed length of the ceramic foam body, a corresponding number of the reheated plastic slices of a first series are stacked one on top of the other such that holes penetrating the whole thickness are created. At one end another reheated plastic foam slice, this time from the second series, is laid on such that the holes in this slice come to rest on the holes in the slices of the first series. In the same way a reheated plastic foam slice of the third series is laid on the other end such that the holes closed off by the plastic foam slice at the other end are open over their whole surface. This produces in principle plastic foam blocks as shown in FIG. 1 with holes that are very deep in relation to their diameter.

In practice only large plastic foam blocks can be manufactured with this method; it is useful therefore to impregnate the plastic foam block before fitting them together.

Plastic foam blocks made up a spiral wound bodies or of slices are suitable in particular for manufacturing diesel engine soot-removing filters for commercial vehicles as in that case large dimensions are the rule.

Figure 2:
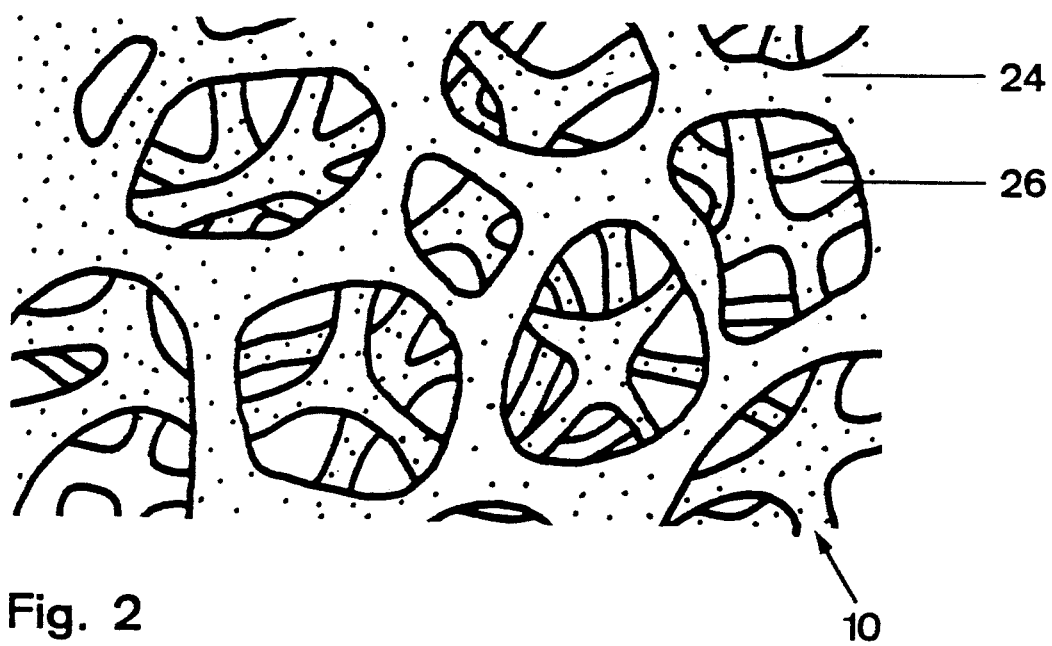

The invention is, apart from the state-of-the-art method in FIG. 1, explained in greater detail in the following with the aid of the examples shown in the figures. These show schematically:

FIG. 2 A greatly magnified view of part of a ceramic foam.

Figure 3:
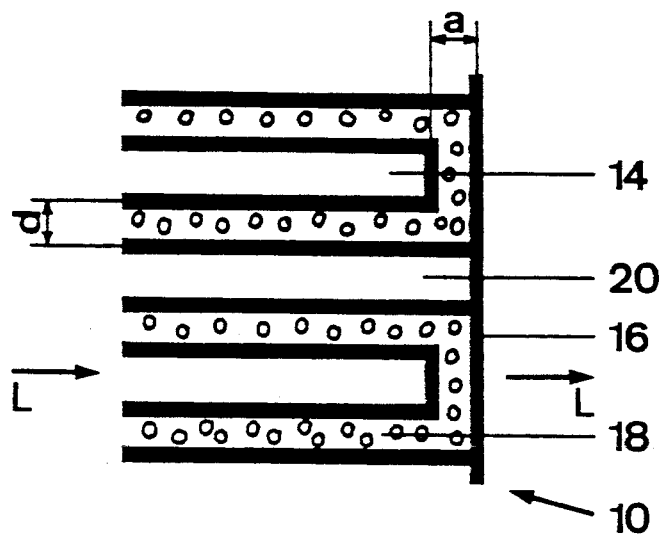

FIG. 3 A magnified view of part of a section through one end of a ceramic foam body.

Figure 4:
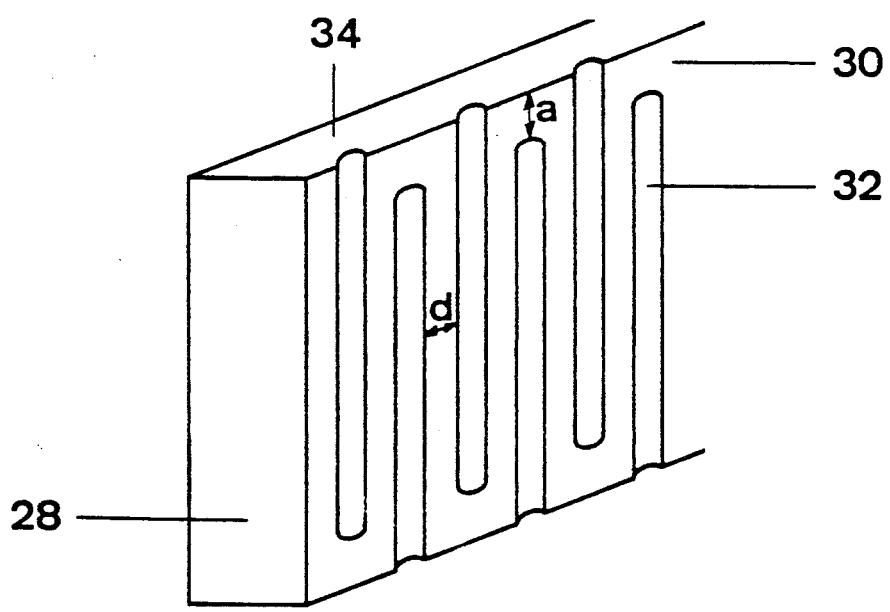

FIG. 4 A plastic foam in the form of a strip.

Figure 5:
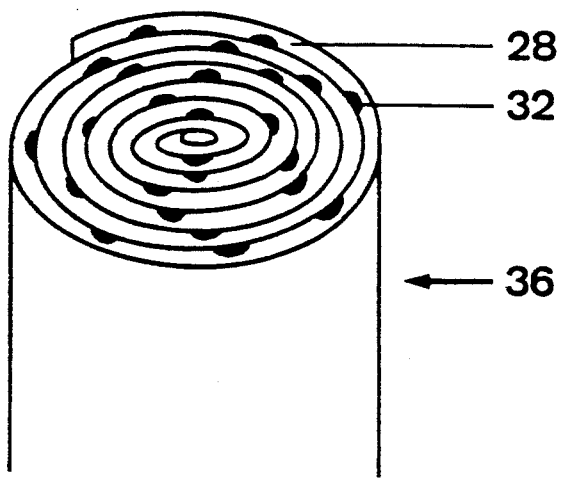

FIG. 5 A plastic foam block made up from a strip as shown in FIG. 4.

Figure 6:
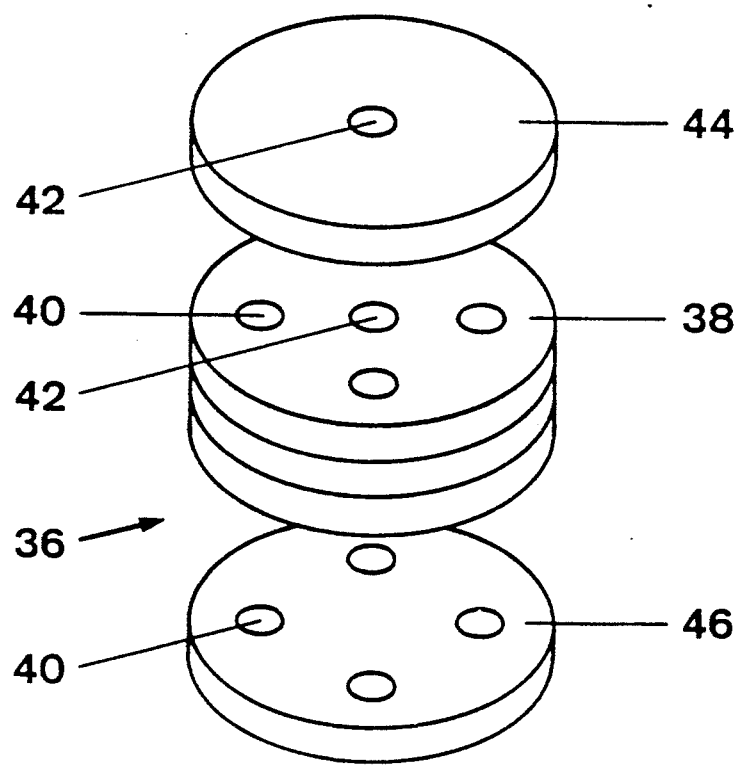

FIG. 6 Plastic foam slices for building up a plastic foam block.

The greatly magnified foam body of ceramic shown in FIG. 2 shows the three dimensional network type of structure with ceramic ribs 24 forming open pores 26. The number of pores per unit length is chosen such that an optimal balance between pressure drop and efficiency is obtained for the application in question. When a contaminated gas flows through, the solid particles e.g. diesel engine soot remain stuck to the ceramic ribbing.

The structure of the ceramic foam body shown in FIG. 2 has a very large active surface area, which also makes the ceramic ribbing 24 an optimal catalyst support.

FIG. 3 shows in detail the region at the outlet end 16 of a ceramic foam body 10. The general direction of gas flow is indicated by the letter L. The channels 14 are closed near the outlet end; they do not yet contain gas flowing through a separating wall 18. The channel 20 are open in the region of the outlet end 16; they contain only gas that has entered them through a separating wall 18.

The distance d of the channel 14 from the channel 20 is smaller than the distance a of the blind end of a channel 14 from the outlet end 16. Because of the resultant increased resistance to flow, the amount of gas flowing from channel 14 directly through the wall at the outlet end 16 is smaller than that given by the ratio of geometric surface areas. The inlet end, not shown here, behaves correspondingly.

The strip-shaped plastic foam 28 shown in FIG. 4 is about 40 mm thick. Grooves 32 which are semi-circular in shape in cross-section are present on one surface 30; the said grooves 32 are a length a shorter than the height of the plastic strip 28. The grooves 32 are alternately open or closed at one narrow longitudinal side 34. Both the diameter of the groove 32 and the distance d between the grooves is about 10 mm.

FIG. 5 shows a plastic foam strip 28 that has been spirally wound into a large-format plastic foam block 36 such that the grooves 32 lie on the inside of the plastic foam strip 28. Together with the outer face of the adjacent inner winding the grooves 32 form longitudinal channels. Only every second longitudinal groove 32 is visible, the others are closed at the end in view.

From the functional standpoint the foam body 10 of ceramic made out of a plastic foam block 36 represents a homogeneous, foamed plastic with holes machined in it.

FIG. 6 shows plastic foam in the form of round slices in the process of being fitted together to make a large-format plastic foam block 36. For simplicity only few holes running through the plastic slices are shown here in order that the principle can be better understood. In reality the slices making up a large-format plastic foam block feature several dozen holes.

Several plastic foam slices 38 with a central hole 42 and four peripheral holes 40 are placed one on top of the other in such a way that the holes form a continuous, through-thickness channel. At one end a plastic foam slice 44 features only one central hole 42 while at the other end a plastic foam slice 46 is provided with four peripheral holes 40. The holes in both end slices 44, 46 are in-line with the corresponding holes in the plastic foam slices 38 when all are fitted together.

When the plastic foam slices 38, 44, 46 are all fitted together a central hole 42 is open at the top and closed at the bottom; four peripheral 40 on the other hand are open at the bottom and closed at the top. This way a large format ceramic foam body can be manufactured with channels that can be very narrow in relation to their length. As a result of the process according to the invention it is possible to make the plastic foam slices 38, 42, 44 relatively thick, which is important in particular for the inner slices 38.

EXEMPLIFIED EMBODIMENTS

1. A diesel engine soot-removing filter for a private car, a ceramic foam filter, has a porosity of 70 PPI. The outer diameter is 160 mm, the height 170 mm. 21 holes of 8 mm diameter have been bored in from one end, while 16 identical holes have been bored in from the other end. The length of the holes amounts to 145 mm, the distance between the holes 10 mm.

2. A diesel engine soot-removing filter for a commercial vehicle has likewise a porosity of 70 PPI. The ceramic foam filter has a diameter of 295 mm and a height of 330 mm. 96 holes of 8 mm diameter have been bored in from one end, 43 holes of the same diameter from the other end. The depth of the holes is 305 mm; the blind end is therefore 25 mm from the neighboring end. The distance between the holes is 10 mm.

What is claimed is:

1. Process for manufacturing a Z-flow filter comprising an open pore foam body with a three dimensional ceramic structure, which comprises:

providing a soft open pore plastic foam strip;

impregnating said foamstrip at least once with a ceramic suspension;

freeing said foam strip of excess suspension;

assembling a plastic foam block with a layered structure from said impregnated plastic foam strip by either (a) forming slices from said impregnated strip and stacking at least two of said slices to form layers of impregnated plastic foam including holes therein as flow channels, or (b) coiling said impregnated plastic foam strip to form layers and forming holes as flow channels between at least two of said layers;

heating to a temperature below the melting point of the plastic; and finally burning off the plastic foam at a temperature at which the ceramic sinters together to form the Z-flow filter with longitudinal channels therein which serve as flow channels.

2. Process according to claim 1 wherein the soft open pore plastic foam strip is cooled to make it rigid and the cooled plastic foam strip is machined prior to said impregnating.

3. Process according to claim 2 wherein the foam strip is cooled by a means selected from the group consisting of impregnating with liquid nitrogen and impregnating with liquid air.

4. Process according to claim 2 wherein the pores in the foam strip are filled with a medium that is liquid, the medium solidified by cooling, the plastic foam machined along with the solidified medium, and the medium melted and removed from the pores in the foam strip.

5. Process according to claim 2 wherein the plastic foam strip is cooled and machined on one surface to provide grooves thereon, heated, and coiled to form the layers wherein the grooves form the holes.

6. Process according to claim 2 wherein said assembling is carried out by forming slices from said impregnated strip and stacking at least two of said slices to form layers of impregnated plastic foam.

7. Process according to claim 6 wherein said slices comprise a first series of slices with openings therein, a second series of slices with opening therein comprising alternatingly a fraction of the openings of the first series, and a third series of slices with the other fraction of openings of the first series, wherein said slices are assembled to give a plastic foam block in which at least one slice of the first series is assembled with a slice of the second series at one end and a slice of the third series at the other end such that blind holes running from one end of the foam block to the region near the region near the other end of the foam block are created.

8. Process according to claim 1 wherein the filter is a filter for the treatment of hot gases.

9. Process according to claim 1 wherein the filter is a catalyst support.

10. Process according to claim 11 wherein the block has a longitudinal direction, ends, and blind-end holes which run parallel in the longitudinal direction and serve as flow channels, said holes extend alternatingly from one end to the other end and such that the depth of the hole is at least five times as large as the smallest cross-sectional dimension and the blind-end of the hole is a distance from the neighboring end that corresponds at least to the mutual distance the holes are apart.

11. Process according to claim 10 wherein the smallest cross-sectional dimension of the holes is 5-50 mm.

12. Process according to claim 10 wherein the smallest cross-sectional dimension of the holes is 6-15 mm.

13. Process according to claim 16 wherein the holes are made at a regular distance apart in the range of 5-50 mm, and the blind-ends of the holes are a regular distance in the range of 10-50 mm, from the neighboring end.

14. Process according to claim 1 wherein the pores in the foam strip are filled with water and the temperature lowered to below the freezing point of water for machining purposes, whereby the plastic remains soft.

15. Process according to claim 2 wherein the machining takes place by a method selected from the group consisting of drilling, milling, and sawing.

16. Process according to claim 1 wherein said assembling is carried out by forming slices from sad impregnated strip and stacking at least two of said slices to form layers of impregnated plastic foam.

17. Process according to claim 16 wherein said slices comprise a first series of slices with openings therein, a second series of slices with openings therein comprising alternatingly a fraction of the openings of the first series, and a third series of slices with the other fraction of openings of the first series, wherein said slices are assembled to give a plastic foam block in which at least one slice off the first series is assembled with a slice of the second series at one end and a slice off the third series at the other end such that blind holes running from one end of the foam block to the region near the region near the other end of the foam block are created.

18. Process according to claim 17 wherein the openings are formed mechanically.

19. Process according to claim 1 wherein said assembling is carried out by coiling said impregnated plastic foam strip to form layers and wherein said foam strip has narrow longitudinal sides and precisely shaped grooves in one surface thereof and is coiled to give intimate contact between coil windings, the grooves being altnerratingly open at one narrow longitudinal side of the strip and closed at the other side.

20. Process according to claim 19 wherein said grooves are formed mechanically.

* * * * *

UNITED STATES PATENT AND TRADEMARK OFFICE
CERTIFICATE OF CORRECTION

PATENT NO. : 5,066,432

DATED : November 19, 1991

INVENTOR(S) : JEAN-PIERRE GABATHULER ET AL.

It is certified that error appears in the above-identified patent and that said Letters Patent is hereby corrected as shown below:

Column 5, claim 7, line 65, "opening" should read --openings--.

Column 6, claim 10, line 13, "claim 11" should read --claim 1--.

Column 6, claim 13, line 26, "claim 16" should read --claim 10--.

Column 6, claim 16, line 39, "sad" should read --said--.

Column 6, claim 17, lines 49 and 50, "off" should read --of--.

Signed and Sealed this

Twenty-third Day of March, 1993

Attest:

STEPHEN G. KUNIN

*Attesting Officer*     Acting Commissioner of Patents and Trademarks